J. R. PEARSON.
GEARING.
APPLICATION FILED JUNE 25, 1914.
1,148,795.
Patented Aug. 3, 1915.
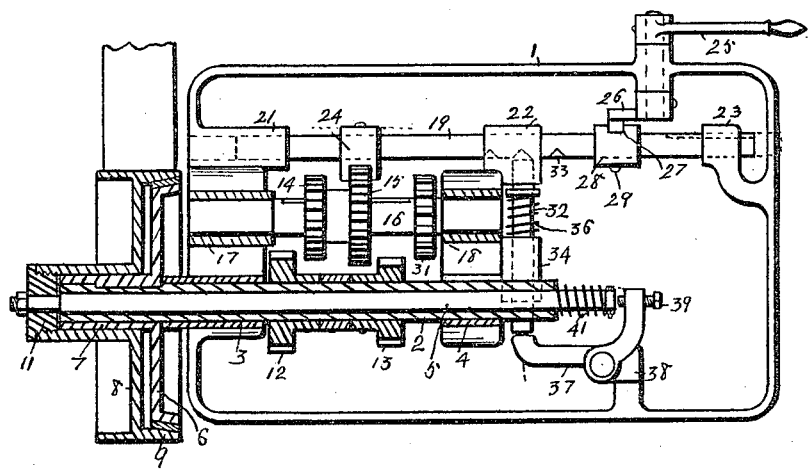
Witnesses.
Phebe A. Carr.
James J. Carr
James R. Pearson, Inventor.
By Robert S. Carr,
Attorney.

UNITED STATES PATENT OFFICE.

JAMES R. PEARSON, OF CINCINNATI, OHIO, ASSIGNOR TO THE ACME MACHINE TOOL COMPANY, OF CINCINNATI, OHIO, A CORPORATION OF OHIO.

GEARING.

1,148,795.   Specification of Letters Patent.   Patented Aug. 3, 1915.

Application filed June 25, 1914. Serial No. 847,197.

*To all whom it may concern:*

Be it known that I, JAMES R. PEARSON, a citizen of the United States, residing at Cincinnati, Ohio, have invented a new and useful Improvement in Gearing, of which the following is a specification.

My invention relates to gearing of the class adapted to the use of machine tools or for other suitable purposes, and my improvements consist of means for alternately changing the speeds and actuating the detachable connections with the source of power; to provide means for actuating the clutch connections with the source of power alternately with the shifting of the speed changing gears by means of the movement of a single hand lever in either of opposite directions and in a single plane, and to provide simple and durable construction and assemblage of the various coacting members for securing facility of operation and efficiency of action.

These objects may be attained in the following described manner as illustrated in the accompanying drawings, in which: The figure represents a diagram partly in section of a gearing embodying my improvements.

In the drawings, 1 represents the frame or support, 2 a sleeve journaled in bearings 3 and 4 and wherein the axial shaft 5 is longitudinally movable. A clutch member 6 is secured on one end of the sleeve with its hub 7 journaled in the axial bore of the driving pulley 8 which is formed with the corresponding clutch member 9. Said pulley is movably secured on the end of shaft 5 by means of the internal nut 11 whereby it may be moved with the shaft to effect the engagement or disengagement of the clutch members 6 and 9.

Differential gears 12 and 13 are secured on sleeve 2 in fixed relation to each other and corresponding gears 14 and 15 in fixed relation to each other are splined on the driven shaft 16 which is journaled in bearings 17 and 18. A shifting rod 19 slidably mounted in fixed bearings 21, 22, and 23, is provided with a yoke 24 movably engaging with gear 15 for moving it with gear 14 longitudinally on shaft 16. A hand lever 25 journaled in the frame is provided with a crank arm 26 which movably engages in a transverse slot 27 formed in the collar 28 which is adjustably secured on the shifting rod 19 by means of the screw 29. The movement of the hand lever with the crank arm in the slot 27 serves to shift the rod 19 with the gears 14 and 15 selectively in or out of engagement with the corresponding gears 12 and 13 for the purpose of changing the speed of shaft 16 with the transmission gear 31 thereon.

A detent plunger 32 formed with a conical point adapted to detachably engage with corresponding recesses or notches 33 formed in the shifting rod 19 is slidably mounted in bearings 34 and 22 and a coiled spring 36 thereon serves to automatically move and maintain said plunger under a yielding pressure with its point in engagement with the notches 33 in registration therewith. A bell crank lever 37 pivotally mounted on a fixed bearing 38 is arranged at one end to contact with the lower end of the detent plunger 32 and is provided at the other end with an adjusting screw 39 adapted to contact with the end of the shaft 5 for moving it longitudinally with the driving pulley and clutch member 9 out of engagement with the clutch member 6. A coiled spring 41 on the driving shaft serves to automatically move and maintain under a yielding pressure said shaft in the opposite direction with said clutch members in frictional engagement.

In operation, a movement of the hand lever actuates the rod longitudinally for simultaneously sliding the driven gears toward either of the corresponding driving gears and for forcing the detent plunger out of its seat in said rod. This movement of the plunger actuates the bell crank lever to move the driving shaft with the pulley sufficiently for effecting the disengagement of the clutch members, whereby the driving gears are disconnected from the source of power. The continued movement of the shifting rod by means of the hand lever serves to selectively engage corresponding driving and driven gears and bring the corresponding notch in the shifting rod into automatic engagement with the plunger. When the plunger is in engagement with a notch in the rod, the coiled spring on the shaft automatically moves said shaft to engage the clutch members, as described. A movement of the hand lever in a single plane thus serves to actuate the connections for successively disconnecting the gearing from the source of power and for shifting the change speed gears while they are so disconnected.

Having fully described my improvements, what I claim as my invention and desire to secure by Letters Patent of the United States is:

1. A gearing comprising a hollow driving shaft provided with a clutch member and with different size gears, a spring actuated member movable automatically in one direction therein and provided with a coöperating driven clutch member, a driven shaft, change speed gears splined thereon, a shifting rod for selectively engaging said gears with the former gears, and connections actuated by said rod for moving said member with the driven clutch in the opposite direction.

2. A gearing comprising a hollow driving shaft provided with a clutch member and with different size gears, a coöperating driven clutch member, a spring actuated shifting member therefor and movable longitudinally within the hollow shaft, a driven shaft, change speed gears splined thereon, a shifting rod therefor formed with detent notches, a spring actuated detent plunger arranged to automatically engage with the notches, and means actuated thereby for moving and maintaining the shifting member with the driven clutch member out of engagement with the first mentioned clutch member during the movement of the shifting rod.

3. A gearing comprising a hollow shaft, driven clutch connections therewith, a driven shaft, change speed gear connections between the shafts, a lever actuated shifting rod for selectively engaging the gears and formed with detent notches, a spring actuated plunger for automatically engaging with the notches, a spring actuated shifting member slidable within the hollow shaft for moving and maintaining under a yielding pressure the clutch connections in engaged position, and connections actuated by the plunger for positively moving said member with the clutch connections out of engagement.

4. A gearing comprising a hollow shaft, driven clutch connections therewith, a driven shaft, change speed gear connections therefrom with the hollow shaft, a shifting rod for selectively engaging the gears and formed with detent notches corresponding to the engaged and disengaged position of the gears, a detent plunger, a spring arranged for moving and maintaining the plunger under a yielding pressure in engagement with the notches, a shifting member for the clutch connections and slidably mounted within the hollow shaft, a spring for moving and maintaining said member under a yielding pressure with the clutch connections in engagement, and means actuated by the movement of the plunger from the notches for moving the member with the clutch connections out of engagement, whereby the gears and the clutch connections may be alternately engaged and disengaged by the continued movement of the shifting rod in either of opposite directions.

JAMES R. PEARSON.

Witnesses:
 A. J. JONES,
 WILLIAM H. BOCH.

Copies of this patent may be obtained for five cents each, by addressing the "Commissioner of Patents. Washington, D. C."